United States Patent Office 3,325,541
Patented June 13, 1967

3,325,541
PROCESS FOR THE MANUFACTURE OF BENZENE-SULFONYL ISOUREA ETHERS
Walter Aumüller, Kelkheim, Taunus, Germany, assignor to Farbwerke Hoechst Aktiengesellschaft vormals Meister Lucius & Brüning, Frankfurt am Main, Germany, a corporation of Germany
No Drawing. Filed June 9, 1964, Ser. No. 373,858
Claims priority, application Germany, June 12, 1963, F 39,968
1 Claim. (Cl. 260—556)

The present invention relates to a new, industrially important and—in comparison with the state of the art—surprising process for the manufacture of N-benzenesulfonyl-N'-isourea ethers of the general formula

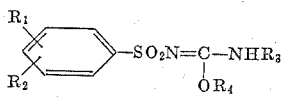

which process comprises reacting a compound of the formula

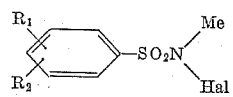

with an isonitrile of the formula

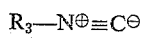

in the presence of an alcohol of the formula

In the aforementioned formulae $R_1$ and $R_2$ represent hydrogen, the halogens fluorine, chlorine, bromine or iodine, an alkyl or alkoxy radical of 1 to 6 carbon atoms, and if $R_1$ is hydrogen, $R_2$ represents a lower aliphatic acyl radical or an aromatic acyl radical, the nitro group or an acylated amino group. As alkyl radicals there are preferably used methyl, ethyl, propyl, isopropyl, butyl, isobutyl or sec. butyl radicals, as alkoxy radicals there enter into consideration methoxy, ethoxy, propoxy or butoxy radicals. As lower aliphatic acyl radicals, acetyl, propionyl or butyryl radicals and as aromatic acyl radicals, benzoyl, o-, m- or p-toluyl radicals for example, can advantageously be used. As acylated amino groups, formylamino, acetylamino, propionylamino or benzoylamino groups enter into consideration; Hal stands for chlorine or bromine; Me represents an alkali metal, for example lithium, sodium potassium, or an alkaline earth metal equivalent. By alkaline earth metal equivalents, equivalents of the metals calcium or magnesium are to be understood; $R_3$ is a saturated or unsaturated aliphatic or cycloaliphatic or mixed aliphatic cycloaliphatic hydrocarbon radical which, if desired, may be interrupted by oxygen or sulfur and which as an open chain can contain 2 to 8 carbon atoms, or as a ring system can contain 3 to 8 carbon ring atoms, or a phenylalkyl radical. As aliphatic radicals there enter into consideration ethyl, propyl, butyl, amyl, hexyl, heptyl and octyl radicals and, if desired, the isomers thereof; as cycloaliphatic radicals there are mentioned cyclopropyl, cyclobutyl, cyclopentyl, cyclohexyl, cycloheptyl and cyclooctyl radicals. As cycloaliphatic radicals interrupted by oxygen or sulfur there are finally mentioned by way of example:

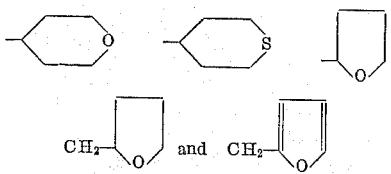

As mixed aliphatic cycloaliphatic hydrocarbons there enter into consideration: alkyl-substituted cycloalkyl radicals of 4 to 8 carbon atoms, for example methyl-cyclohexyl, dimethyl-cyclohexyl, methyl-cyclopentyl, ethyl-cyclopentyl, methyl-cyclobutyl, dimethyl-cyclopropyl radicals or alkyl radicals which are substituted by cycloalkyl radicals and which together contain 4–8 carbon atoms, for example, cyclopentyl-methyl, cyclo-hexyl-methyl, cycloheptyl-methyl, cyclopentyl-ethyl, cyclohexyl-ethyl or cyclopropyl-propyl radicals.

As phenylalkyl radicals there are mentioned for example, benzyl, phenylethyl or phenylpropyl radicals. $R_4$ represents a lower alkyl radical which may be interrupted by oxygen, for example methyl, ethyl, propyl, butyl and methoxyethyl radicals, preferably such having not more than 2 carbon atoms. If the sodium salt of p-toluenesulfonic acid chloramide known as "Chloramin T," and cyclohexyl-isonitrile in methanol are used, the reaction according to the process of the present invention proceeds according to the following equation:

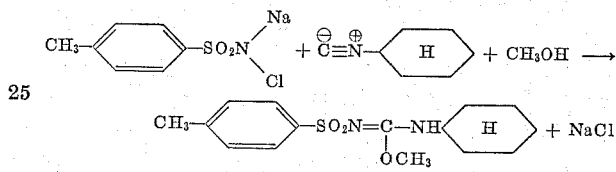

The aforementioned equation is not only intended to illustrate the preparation of the N-(4-methyl-benzenesulfonyl)-N'-cyclohexyl isourea methyl ether, but it is also intended to demonstrate the course of the reaction in general.

Apart from the surprising course of the reaction which has not been described until now, it is a particular advantage of the process of the present invention that the required starting substances can be obtained in a simple way. For example, the sodium salts of sulfonic acid chloramide can be obtained according to the process described in German Patent No. 390,658 from sulfonamides by reaction with calcium hypochlorite in an aqueous medium and precipitation by means of sodium chloride. The so obtained crude products can be used directly for further reactions.

The isonitriles used according to the process of the present invention can be obtained with good yields according to known methods for example as described by Ugi and Meyr, Ber., 93, page 264 (1960).

The process of the present invention is carried out in a very simple way by dissolving the reactants, which are preferably used in equivalent quantities, in an excess of the alcohol required for the reaction and combining them, for example by slowly adding one reaction component dropwise to the other, while stirring. In general, the reaction solution is moderately heated on the steam bath for about 30 minutes to 2 hours. It may also be sufficient to abandon the reaction mixture at room temperature for a longer period. For working up the reaction solution which after a temporary yellow coloration becomes colorless again, it is concentrated, treated with water, if necessary, and decanted, and the residue obtained is crystallized by means of ether. Sometimes, the reaction product crystallizes directly when being concentrated. It is filtered with suction and recrystallized from the alcohol used in the reaction. Other organic solvents, for example, acetic ester/benzene can also be used for the crystallization.

As reaction components for the process according to the present invention there enter into consideration: chloramide alkali metal salts, particularly chloramide sodium salts of aromatic sulfonic acids, such as benzenesulfonic acid chloramide sodium, p-toluene-sulfonic acid chloramide sodium, 4-chloro-benzenesulfonic acid chloramide sodium, 2-methyl - 6 - chlorobenzene-sulfonic acid chloramide sodium, 4 - methoxy - benzenesulfonic acid chloramide sodium, 3 - methyl - benzene sulfonic acid chloramide sodium and the corresponding bromine compounds for example p-toluene-sulfonic acid bromamide sodium.

As isocyanides there can be used: aliphatic and cycloaliphatic isonitriles, such as butylisocyanide, isobutylisocyanide, isoamylisocyanide, cyclopentylisocyanide, cyclohexylisocyanide, substituted cyclohexylisocyanides such as 4-methyl-cyclohexylisocyanide, 4-isopropyl-cyclohexylisocyanide, cycloheptylisocyanide, cyclooctylisocyanide, benzylisocyanide, β-phenylethylisocyanide.

As alcohols used for carrying out the reaction, particularly primary aliphatic lower alcohols are suitable, for example methanol, ethanol, propanol, butanol, and β-methoxyethyl alcohol.

The products obtained by the process of the present invention are valuable intermediate products for the manufacture of benzenesulfonyl-alkylureas known as anti-diabetics to be administered per os, into which they can be converted by acid or alkaline hydrolysis.

The reaction of the process of the present invention is a reaction which has not until now been described in the relevant literature.

It is surprising that it is possible to conduct the reaction of benzene-sulfonic acid halogen amide salts with an isonitrile by the use of alcohols as reaction medium in such a way that a smooth reaction is attained, while very pure benzenesulfonyl isourea ethers are formed which can easily be isolated and converted into benzenesulfonyl-alkylureas. Furthermore, disturbing side reactions are avoided.

According to this process it is, moreover, possible to prepare benzenesulfonyl isourea ethers deriving from alcohols of more than 2 carbon atoms, which in general can be obtained with difficulties only. The following examples serve to illustrate the invention, but they are not intended to limit it thereto:

EXAMPLE 1

*N-(4-methyl-benzenesulfonyl)-N'-cyclooctyl-isourea-methyl ether*

28.1 grams of Chloramin T containing 3 mols of crystal water are dissolved in 150 cc. of methanol. While shaking, a solution of 13.7 grams of cyclooctyl-isonitrile (prepared according to Ugi and Meyr, Ber. 93, page 246 (1960), boiling point 95–96° C. under a pressure of 9 mm. of mercury), dissolved in 50 cc. of methanol is added. The solution is heated for 30 minutes under reflux, cooled, the precipitated sodium chloride is removed by filtering with suction, and the solution is concentrated. The precipitate obtained after having added water is freed from the water decanting and triturated with ether. The crystalline product obtained is filtered with suction and dried on the steam bath. The yield of N-p-toluene-sulfonyl-N'-cyclooctyl-isourea methyl ether amounts up to 65%. After recrystallization from methanol, the product melts at 125–128° C.

N-(4 - methyl-benzenesulfonyl)-N'-cyclooctyl - isourea ethyl ether melting at 94–96° C. (after recrystallization from methanol) is obtained in an analogous manner with a yield of 63% from 13.7 grams of cyclooctyl-isonitrile and 28.1 grams of Chloramin T with the use of ethanol; in this case the alcoholic solution of Chloramin T is dropwise added to the solution of the isonitrile, while stirring, since the components possess a strong reactivity. The following substances were prepared according to Example 1 with the use of an equivalent each of a benzenesulfonyl-chloramide sodium compound and of a cyclic or aliphatic isonitrile in methanol:

N-(4-methyl-benzenesulfonyl)-N'-cyclohexyl-isourea methyl ether, melting point 112–114° C. from methanol, N-(4-methyl-benzenesulfonyl)-N'-cyclopentyl-isourea methyl ether, melting point 93–95° C. from isopropanol, N-(4-methyl-benzenesulfonyl)-N'-cycloheptyl-isourea methyl ether, melting point 118–120° C. from methanol, N-(4-methyl-benzenesulfonyl)-N'-isobutyl-isourea methyl ether, melting point 77–79° C. from acetic ester/petroleum ether, N-(4-methyl-benzenesulfonyl)-N'-benzyl-isourea methyl ether, melting point 127–129° C. from methanol, N-(4-methoxy-benzenesulfonyl-N'-cyclooctyl-isourea methyl ether, melting point 107–109° C. from methanol.

EXAMPLE 2

*N-(4-chlorobenzenesulfonyl)-N'-cyclooctyl isourea methyl ether*

12 grams of 4-chlorobenzene-sulfonic acid bromamide sodium containing 3 mols of crystal water are dissolved in 60 cc. of methanol. A solution of 4.7 grams of cyclooctyl isonitrile in 20 cc. of methanol is added, and the whole is heated for two hours under reflux. The solution is then concentrated in vacuo, the residue is mixed with water and, after having decanted the water, it is caused to crystallize by triturating it with ether. The N-(4-chloro-benzene sulfonyl)-N'-cyclooctyl-isourea methyl ether thus obtained melts at 126–128° C. after recrystallization from methanol. The yield is 60%.

EXAMPLE 3

*N-benzenesulfonyl-N'-cyclooctyl-isourea methyl ether*

15.6 grams of benzene-sulfonic acid bromamide sodium are dissolved in 60 cc. of methanol. To this solution 6.9 grams of cyclooctyl isonitrile are added which was taken up in 30 cc. of methanol. The solution is heated under reflux for 1 hour, the methyl alcohol is distilled off in vacuo, the residue obtained is mixed with water and filtered with suction. After digestion with diisopropyl ether, filtering with suction and drying in the open air, the N-benzenesulfonyl-N'-cyclooctyl-isourea methyl ether is obtained. It melts at 57.5–59.5° C. after recrystallization from methanol.

EXAMPLE 4

*N-(3,4-dimethoxy-benzenesulfonyl)-N'-cyclooctyl-isourea methyl ether*

According to the method described in Example 3 the N-(3,4-dimethoxy-benzenesulfonyl) - N' - cyclooctyl-isourea methyl ether is obtained by boiling a methanolic solution of 5.1 grams of 3,4-dimethoxy-benzenesulfonic-acid bromamide sodium and 2 grams of cyclooctyl isonitrile, concentrating it in vacuo and digesting it with water and subsequently with diisopropyl ether. The substance obtained melts at 101–103° C. after recrystallization from methanol.

We claim:

Process for the manufacture of a compound of the formula

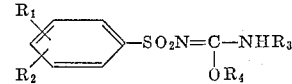

in which $R_1$ is a member selected from the group consisting of hydrogen, halogen, alkyl of 1 to 6 carbon atoms and alkoxy of 1 to 6 carbon atoms, $R_2$ is a member selected from the group consisting of hydrogen, halogen, alkyl of 1 to 6 carbon atoms, alkoxy of 1 to 6 carbon atoms and, if $R_1$ is hydrogen, a member selected from the group consisting of lower alkanoyl, benzoyl, toluyl, nitro, lower alkanoylamino and benzoylamino, $R_3$ is a member selected from the group consisting of (a) alkyl of 2–8 carbon atoms; (b) cycloalkyl of 3–8 carbon atoms; (c)

alkyl-cycloalkyl of 4–8 carbon atoms; (d) cycloalkyl-alkyl of 4–8 carbon atoms and phenyl-alkyl of up to 9 carbon atoms, and $R_4$ is a member selected from the group consisting of lower alkyl and lower alkoxy alkyl, which process comprises reacting a compound of the formula

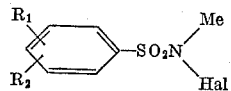

in which $R_1$ and $R_2$ have the meanings given above, Hal is a member selected from the group consisting of chlorine and bromine and Me is a member of the group consisting of an alkali metal atom, calcium and magnesium equivalent with an isonitrile of the formula $$R_3-N^{\oplus}\equiv C^{\ominus}$$

in which $R_3$ has the meaning given above, in the presence of an alcohol of the formula $$R_4OH$$

in which $R_4$ has the meaning given above.

References Cited

Noller: Chemistry of Organic Compounds, page 238 (1957), 2nd ed.

WALTER A. MODANCE, *Primary Examiner.*

HARRY I. MOATZ, *Assistant Examiners.*